May 21, 1957  E. D. DALL  2,793,061
HOOD LATCH STRUCTURE

Filed Jan. 7, 1955  3 Sheets-Sheet 1

INVENTOR.
EDWARD D. DALL
BY
ATTORNEY

May 21, 1957   E. D. DALL   2,793,061
HOOD LATCH STRUCTURE
Filed Jan. 7, 1955   3 Sheets-Sheet 2
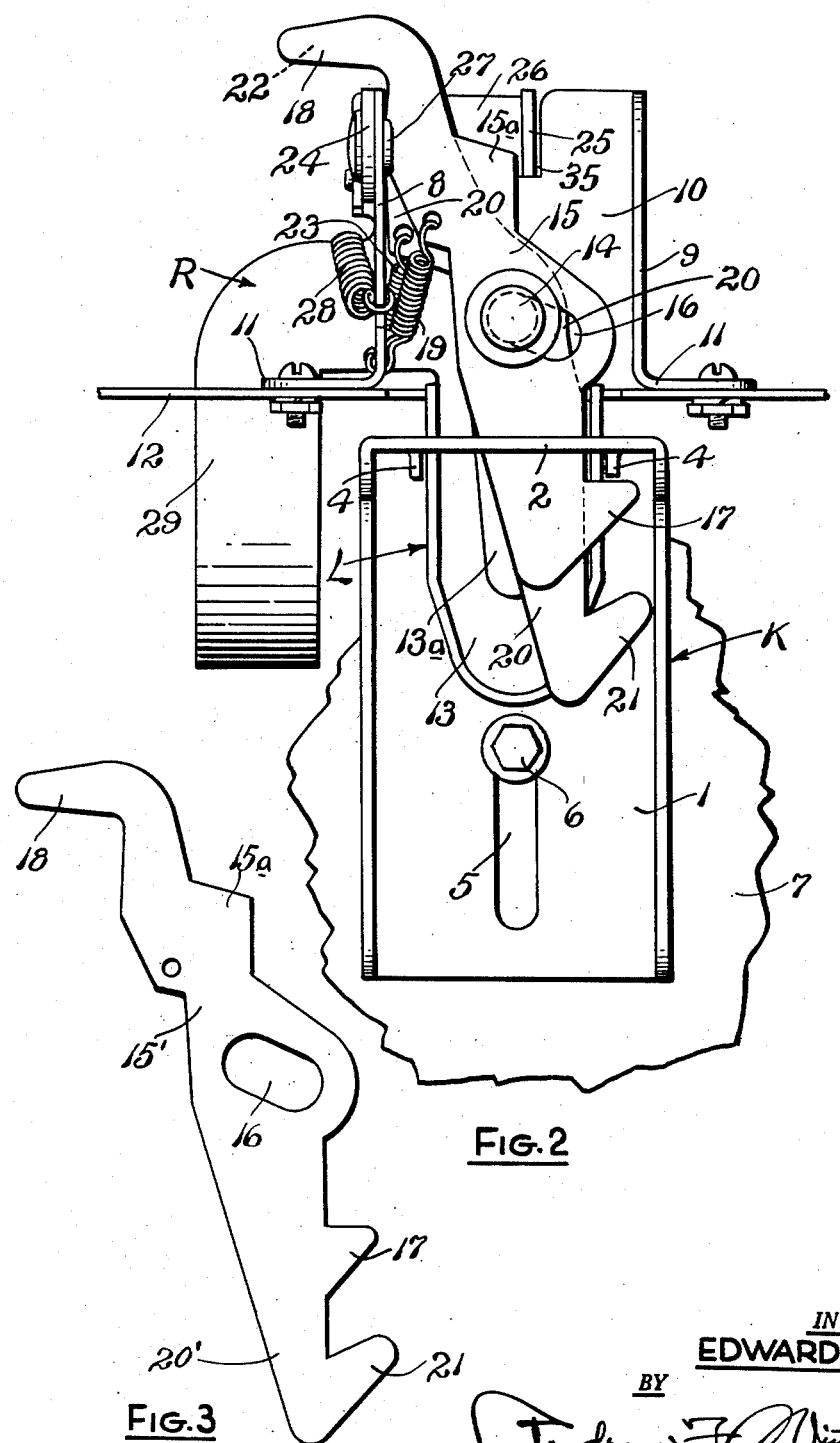
Fig. 2
Fig. 3
*INVENTOR.*
EDWARD D. DALL
BY
ATTORNEY

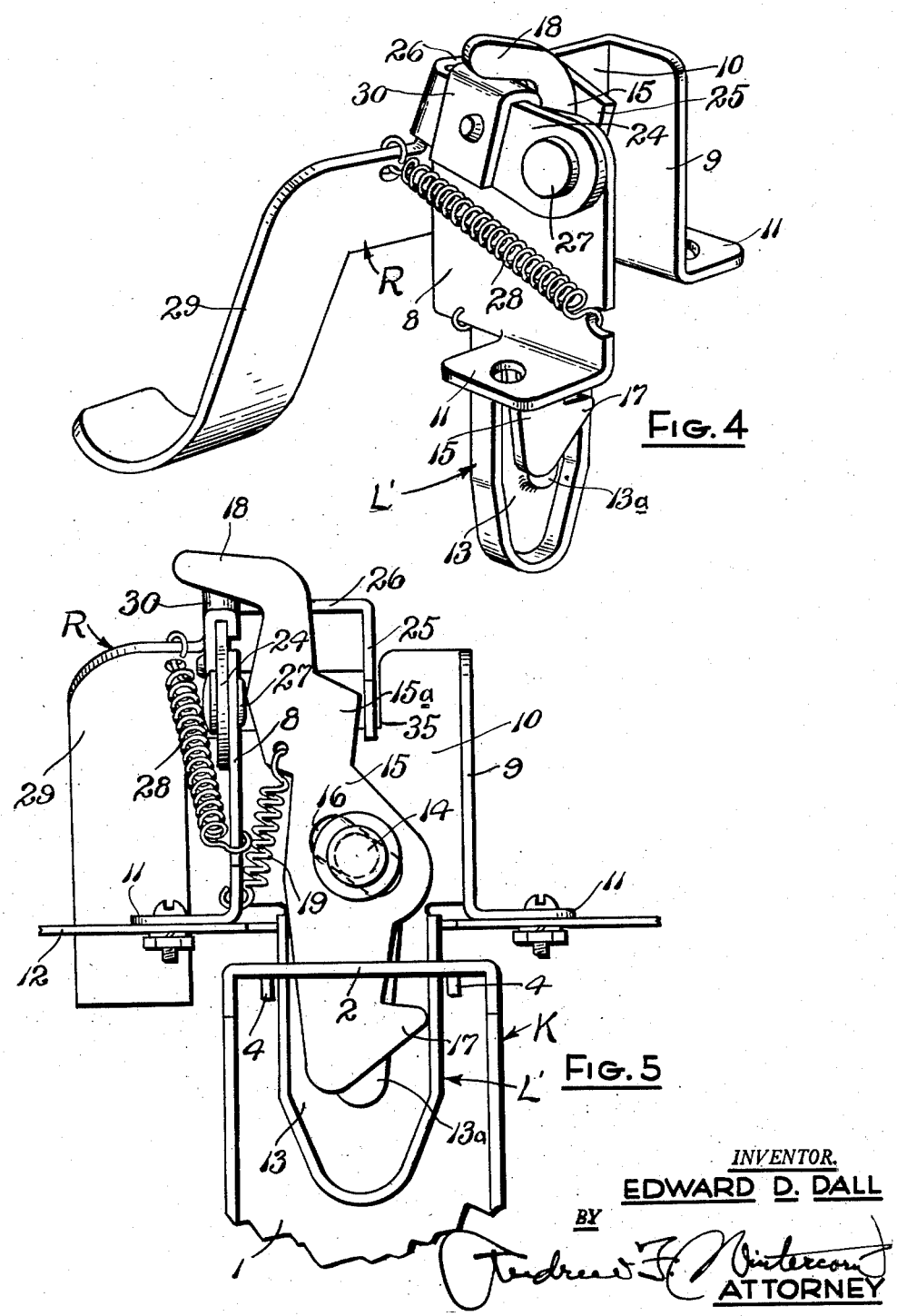

United States Patent Office 2,793,061
Patented May 21, 1957

2,793,061

HOOD LATCH STRUCTURE

Edward D. Dall, Birmingham, Mich., assignor to Atwood Vacuum Machine Company, Rockford, Ill., a corporation of Illinois Application January 7, 1955, Serial No. 480,373

8 Claims. (Cl. 292—6)

This invention relates to a novel, sturdy and dependable latch structure primarily designed and adapted for use in latching the liftable hood enclosing the engine of a motor vehicle to lock said hood releasably in closed position. With my invention a particularly strong and durable, yet simply constructed latch structure for the purpose stated is provided in which latching of the hood in closed position is automatically accomplished by merely moving its front end downwardly or dropping it to such position. The release of the latch is simply and easily accomplished, using a novel principle of operation and novel structure for obtaining the desired results in a most practical and efficient manner.

The invention is illustrated in the accompanying drawings, in which—

Fig. 2 is a rear elevation of the latch structure and keeper showing the latch lockingly engaged in the keeper;

Fig. 3 is an elevation of a combination latch and safety catch lever which is usable as a substitute for the two levers shown in Figs. 1 and 2, one being the latching lever and the other the safety catch lever;

Fig. 4 is a perspective view similar to Fig. 1 showing a modified form of latch structure in which the latching lever alone is used without the safety catch, and Fig. 5 is a rear elevation similar to Fig. 2 indicating the single latch lever of Fig. 4 in full lines, including a dotted line showing of the addition of the safety catch thereto.

Similar reference numerals are applied to corresponding parts throughout these views.

Figure 1:
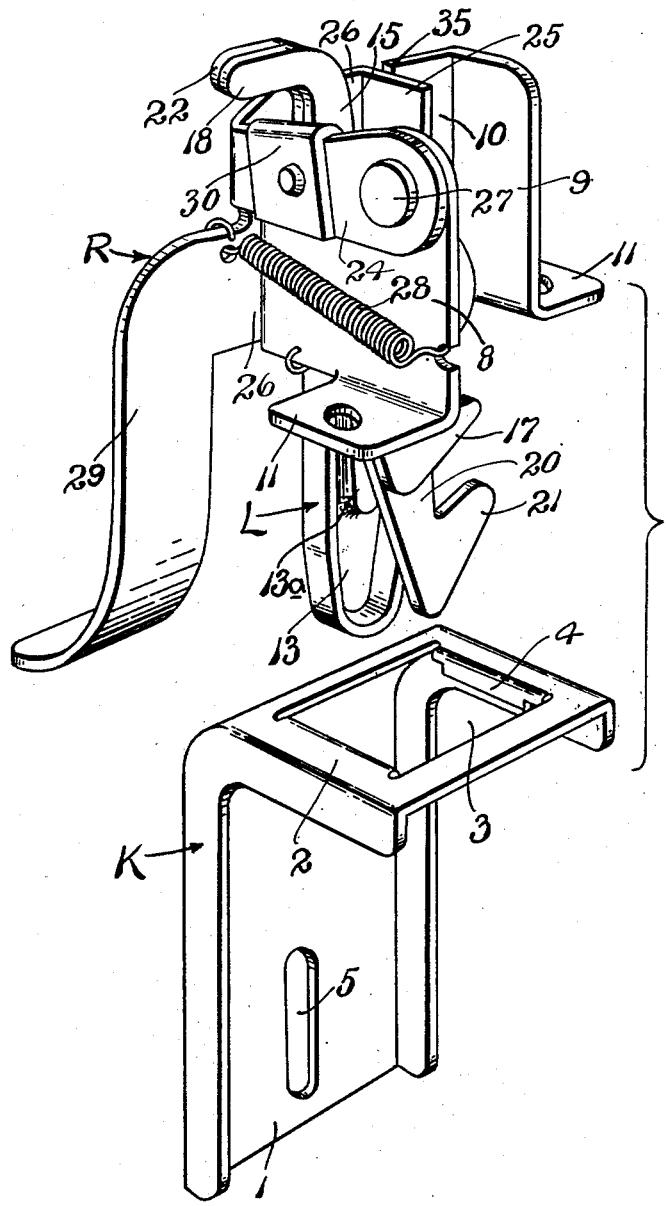
Fig. 1 is a perspective view showing one form of the latch structure of my invention and an associated keeper in spaced sligned relationship.

The keeper indicated at K is formed in dies from a single piece of sheet metal to provide a vertical portion 1 from the upper end of which a horizontal portion 2 extends at right angles. Both portions are reinforced by side edge flanges as shown. The horizontal portion 2 has a rectangular opening 3 provided therein, at opposite sides of which flanges 4 extend downwardly as shown. The vertical portion 1 preferably has one or more vertical slots 5 provided therein to receive bolts 6 for mounting the keeper on a fixed vertical portion 7 of the grille or radiator housing at the front end of the automobile, such mounting permitting any desired adjustment of the keeper in relation to the latch structure L that is mounted on the front end of the raisable hood of the automobile provided as an enclosure for the engine in the usual way.

The latch structure L comprises a generally channel-shaped stamped sheet metal bracket having spaced apart sides or flanges 8 and 9 bent rearwardly at right angles from a web portion 10. The sides or flanges 8 and 9 at their lower ends have outturned ears 11 for connection by means of bolts or the like to a horizontal flange 12 which is located underneath and provided on the front end portion of the aforementioned hood. The vertical web 10 of the bracket has a generally rectangular pilot extension 13 integral therewith and extending downwardly therefrom for reception in the opening 3 of the keeper. The lower end of the extension is rounded and tapered as shown for easier entry in opening 3 and is reinforced at its vertical side edges and at its lower edges by integral flanges as shown. There is also preferably an elongated embossed portion 13a pressed therefrom to the rear. A pivot pin 14 is provided at the upper end of said embossed portion 13a extending rearwardly therefrom on which a latching lever 15 is pivotally and slidably mounted. The latching lever, between its upper and lower ends, has a transverse slot 16, closed at both ends, through which the pivot pin 14 passes freely, the slot being inclined upwardly and laterally from its lower end to its upper end at an acute angle to the horizontal. Above the slotted intermediate portion of the latching lever 15 a shoulder projection 15a is provided on one edge as shown, and at the lower end a laterally reaching latching projection or dog 17 is provided having an inclined lower edge and a substantially horizontal upper edge. At the upper end of the latching lever 15 a laterally reaching tail projection or arm 18 is provided which extends over the upper edge of the adjacent side 8 of the bracket. A coiled tension spring 19 has one end connected to the latching lever 15 above its pivot and the other end connected to the last mentioned side 8 of the bracket near its lower edge. Behind the lever 15 and between it and the embossed portion 13a a second lever 20 is provided, serving as a safety catch. It is stamped from sheet metal the same as the lever 15, and is also pivotally mounted on the pin 14. Lever 20 is longer than lever 15 and has at its lower end, spaced below the latching projection or dog 17 of lever 15, a safety latching projection or dog 21 which extends laterally to one side of lever 20 the same as the projection or dog 17. However, the upper edge of this projection 21 inclines downwardly and inwardly instead of being horizontal like the upper edge of projection 17. Lever 20 has a tail projection or arm 22 on its upper end lying alongside the tail projection or arm 18 of the first lever 15, also extending over the upper edge of the side 8 of the bracket. Lever 20, as indicated in dotted lines in Fig. 2, does not have a slot similar to the slot 16 in it and does not have a projecting shoulder 15a. It could, however, be made substantially identical with lever 15 with a projection matching the projection 15a with a like slot 16. A coiled tension spring 23 is connected at one end with the safety catch lever 20 and at its other end with the side 8 of the bracket and normally turns the lever in a counter-clockwise direction, the same as the spring 19 turns the latching lever 15.

In the form of latch structure L' shown in Figs. 4 and 5 the safety lever 20 is not used. The lever 15 lies in direct abutment with the embossed portion 13a. The additional spring 23 is also omitted.

Instead of having the two levers, namely, the latching lever 15 and safety lever 20, a single combination lever such as that shown at 15' in Fig. 3 may be used to serve the purpose of both. In such a lever construction an extension may be provided on the lower end as at 20' which corresponds to that part of the lever 20 extending below the end of lever 15 together with the latching projection 21. In Fig. 5 the structure using the single latching lever as in Fig. 4 is shown, but it should be understood that the one-piece latching lever 15' shown in Fig. 3, providing the safety latching projection or dog 21, could be used.

In operation, the hood is lifted by hand at its front end and has a hinge connection at its rear end in the usual way with the automobile body, spring means being also provided to counterbalance the weight of the hood to make it easy to raise. However, the hood is unbalanced enough that it will drop to closed position when released, and the latch structure L will then automatically lock the hood by cooperation with keeper K. In closed position, the pilot 13, with the lower end portions of the latching and safety levers 15 and 20 shown in Figs. 1 and 2, extends downwardly through the opening 3 in the keeper K. In closing, the safety dog or projection 21 first, followed by the latching dog or projection 17, have their lower edges ride over the top of flange 4, and, in succession, these parts ride in place underneath said flange. The closed and locked position, as shown in Fig. 2, is with the horizontal upper edge of the projection or dog 17 of the latching lever 15 below the lower edge of flange 4.

For manual release of the spring pressed levers 15 and 20 a releasing lever R is provided. It likewise is made from flat sheet metal, bent to generally U-shaped form, at its upper end providing spaced arms 24 and 25 connected by a cross-portion 26, the cross-portion 26 extending downwardly well below arms 24 and 25 at the front of the web 10 of the latch supporting bracket. The leg 24 of lever R lies alongside the outer side of the flange 8 of said bracket and adjacent its free end is connected by a pivot 27 to said flange 8. The upper portions of the web 10 are cut away as at 35 and the arm 25 extends to the rear through this cutaway portion and is disposed alongside the upper portion of the projection 15a of latching lever 15, providing a dogging stop against normal pivotal movement of the latching lever 15. (See Fig. 2.) A coiled tension spring 28 connected at one end to the web 26 and at its other end to the flange 8 normally holds the release lever R in its operative locking position. This release lever is provided with a handle 29 for manual operation extending laterally from the lower portion of the web 26 and downwardly and forwardly as shown. A saddle 30 of U-form fits over and is secured to arm 24 under the tailpieces 18 and 22 in the form shown in Figs. 1 and 2, and under the tail-piece 18 as shown in Figs. 4 and 5. When the operator takes hold of the handle 29 and pulls outwardly and upwardly thereon the release lever R is turned clockwise about the axis of the pivot 27, whereupon the arm 25 will first release lever 15 at 15a and then the saddle 30 engages under the tail-pieces 18 and 22 swinging both levers 15 and 20 simultaneously in a clockwise direction (as in Fig. 5) to disengage latching projection or dog 17 from the flange 4 and hold the safety projection of dog 21 from engaging the flange 4 when the hood is raised. With the single lever structure shown in Figs. 3, 4 and 5, either with or without the safety dog addition 21, the same clockwise swinging of the lever takes place so that the hood is released and may be raised to open position. In the closing of the hood, the arm 25 which was moved out of the path of movement of the projection 15a when the hood was released is in its down position, as in Fig. 2, in the path of movement of projection 15a on lever 15. With the form which uses the combined latching and safety lever 15' shown in Fig. 3, the safety dog 21 first rides upon the flange 4 of the keeper K and there is a fulcruming of the shoulder 15a against the arm 25 with a clockwise swing of such composite lever and a movement of the lever bodily so that slot 16 traverses the fixed pin 14, and the dog end 17 of lever 15 moves in a substantially horizontal line. If the safety extension is not used, as is shown in full lines in Fig. 5, the same action occurs when the lower edge of the latching dog 17 arrives at and passes by the flange 4. With the two levers used as in Figs. 1 and 2, the dogs 21 and 17 ride against the flange 4 in succession and when both have passed the flange 4 the hood is either automatically securely held in its completely closed position with the latching dog 17 engaged underneath the flange 4, or else it is held by the safety dog 21 and the free end of the hood may be slightly raised so that the dog 21 engages the flange 4 under the action of the lift springs usually provided at the rear of the hood.

While the latch L is shown and described as secured to the hood and cooperating with the keeper K disposed below it and secured to the radiator housing or grill, such latch and keeper may be reversed in position without changing or affecting the latching and releasing operations.

The constructions described are particularly sturdy and dependable, or economical to produce and are very easily operated. Upon extensive test and trial they have proven exceptionally satisfactory.

It is believed the foregoing description conveys a good understanding of the objects and advantages of my invention. The appended claims have been drawn to cover all legitimate modifications and adaptations.

I claim:

1. Latching mechanism comprising a support having a vertical web and a flange at a side edge of said web at right angles thereto, a vertical latching lever located in parallelism to the web and having its upper end portion abutting said flange and extending laterally thereover, a pivot pin fixed to said web, said lever having a transverse slot through which said pin passes to provide a slidable pivotal mounting, spring means acting on said lever to normally move the upper end portion of the lever at one edge against said flange, and a generally U-shaped releasing and holding member having one arm pivotally connected to said flange of the support, the other arm being disposed parallel to the first arm and normally against the lever at the edge thereof opposite the edge of the lever engaging said flange, and a connecting means between said arms arranged to engage said web to limit pivotal movement of said member relative to said support, said latching lever having a laterally extending latching dog on its lower end.

2. Latching mechanism comprising a support having a vertical web and a flange at a side edge of said web at right angles thereto, a latch releasing and holding member comprising an arm abutting the outer side of said flange, a second arm on said member spaced from and parallel to the first arm and also parallel to and spaced from said flange and connecting means on said member between said arms located adjacent said web, means pivotally connecting the first mentioned arm adjacent its free end to said flange, spring means connected to said releasing and holding member normally moving said member to bring the connecting means thereof against said web, a latching lever having an upper end portion disposed between said flange and said second mentioned arm, said lever having a laterally extending tail portion at its upper end reaching over said first mentioned arm, a pin connected to said web, said latching lever having a transverse slot between its ends through which said pin passes to provide a slidable pivotal mounting and also having a laterally extending latching dog on its lower end, and spring means connected with said lever to normally press the upper end portion of said lever against said flange, said lever fulcruming against said second mentioned arm, and said second arm being moved out of engagement with the lever upon moving said releasing and holding member in one direction about its pivotal connection to said flange.

3. Latch mechanism comprising a support having a vertical flat web portion and a flange at right angles to said web, a latch lever located in parallelism to said web and having between the ends of the lever a pin and slot connection with said web permitting up and down movement of said lever with respect to said support at a predetermined angle to the vertical, one end of said lever having a tail-piece extending laterally across the outer edge of said flange, and the other end of said lever having a laterally oppositely extending latching dog, spring means acting on said lever to normally move it into engagement with said flange, and an arm pivotally connected adjacent one end to said flange, adapted to be moved manually against said tail-piece of the lever to move said lever away from the flange against the action of said spring means.

4. Latch mechanism comprising a support having a vertical flat web portion and a flange at right angles thereto, a generally vertical latch lever parallel to and adjacent said web portion, pin and slot means between the ends of said latch lever for pivotally and slidably connecting the lever to said web portion, a spring actuated arm located alongside said flange, means pivotally connecting said arm to the flange at a distance from said web, said arm having connected and movable therewith a second arm parallel thereto and spaced therefrom, between which second arm and the flange member an end of said lever is located, said latch lever at one end having a laterally extending tail-piece located in the path of movement of said first mentioned arm, and an oppositely extending latching dog on the other end of said lever.

5. Latch mechanism comprising, in combination, a bracket having a pilot extension adapted to enter an opening in a keeper wherein a latch is to be lockingly engaged, a latch lever slidably pivoted intermediate its ends on said bracket and having one end portion abutting said pilot extension and provided with a lateral projection on the extremity thereof for locking engagement in the keeper, the bracket having an end portion providing a web and a flange in right angle relation, said latch lever having another end portion arranged to swing laterally into abutment with said flange and disposed in spaced relation to said web, spring means urging said lever into abutment with said flange while holding the lateral projection extended for locking engagement with the keeper, and a spring pressed manually operable latch release lever pivoted on said flange and operatively engaging the flange abutting end of said lever so as to swing it away from the flange and thereby retract the projection on the other end relative to the keeper, said lever having a second lateral projection for engagement with a keeper spaced below the first mentioned projection.

6. Latch mechanism comprising, in combination, a bracket having a pilot extension adapted to enter an opening in a keeper wherein a latch is to be lockingly engaged, a latch lever slidably pivoted intermediate its ends on said bracket and having one end portion abutting said pilot extension and provided with a lateral projection on the extremity thereof for locking engagement in the keeper, the bracket having an end portion providing a web and a flange in right angle relation, said latch lever having another end portion arranged to swing laterally into abutment with said flange and disposed in spaced relation to said web, spring means urging said lever into abutment with said flange while holding the lateral projection extended for locking engagement with the keeper, and a spring pressed manually operable latch release lever pivoted on said flange and operatively engaging the flange abutting end of said lever so as to swing it away from the flange and thereby retract the projection on the other end relative to the keeper, and a second spring pressed latch lever pivoted with the first named latch lever and having at one end a lateral projection for engagement with the keeper that is spaced below the projection on the first named lever, the other end of said second lever being operable like the corresponding end of said first lever by the release lever.

7. Latch mechanism comprising, in combination, a bracket having a pilot extension adapted to enter an opening in a keeper wherein a latch is to be lockingly engaged, a latch lever slidably pivoted intermediate its ends on said bracket and having one end portion abutting said pilot extension and provided with a lateral projection on the extremity thereof for locking engagement in the keeper, the bracket having an end portion providing a web and a flange in right angle relation, said lever having another end portion arranged to swing laterally into abutment with said flange and disposed in spaced relation to said web, spring means urging said lever into abutment with said flange while holding the lateral projection extended for locking engagement with the keeper, and a spring pressed manually operable latch release lever pivoted on said flange and operatively engaging the flange abutting end of said lever so as to swing it away from the flange and thereby retract the projection on the other end relative to the keeper, and a second spring pressed latch lever pivoted with the first named latch lever and having at one end a lateral projection for engagement with the keeper that is spaced below the projection on the first named lever, the other end of said second lever being operable like the corresponding end of said first lever by the release lever, there being on said release lever a part which is normally disposed blocking movement of the flange engaging ends of said levers away from the flange, whereby to secure said levers in locked position.

8. Latch mechanism comprising, in combination, a bracket having a pilot extension adapted to enter an opening in a keeper wherein a latch is to be lockingly engaged, a latch lever slidably pivoted intermediate its ends on said bracket and having one end portion abutting said pilot extension and provided with a lateral projection on the extremity thereof for locking engagement in the keeper, the bracket having an end portion providing a web and a flange in right angle relation, said latch lever having another end portion arranged to swing laterally into abutment with said flange and disposed in spaced relation to said web, spring means urging said lever into abutment with said flange while holding the lateral projection extended for locking engagement with the keeper, and a spring pressed manually operated latch release lever pivoted on said flange and operatively engaging the flange abutting end of said lever so as to swing it away from the flange and thereby retract the projection on the other end relative to the keeper, said lever having a second lateral projection for engagement with the keeper spaced below the first mentioned projection, and said release lever having a part which is normally disposed blocking movement of the flange engaging end of said lever away from the flange, whereby to secure said lever in locked position.

References Cited in the file of this patent

UNITED STATES PATENTS

| | | |
|---|---|---|
| 235,793 | McCurdy | Dec. 21, 1880 |
| 2,031,302 | Clark | Feb. 18, 1936 |
| 2,274,711 | Krause | Mar. 3, 1942 |
| 2,668,778 | Dall | Nov. 10, 1953 |